May 22, 1928.  
P. F. GUTMANN  
1,671,073  
SHEET GLASS PRODUCTION  
Filed May 21, 1925   2 Sheets-Sheet 2
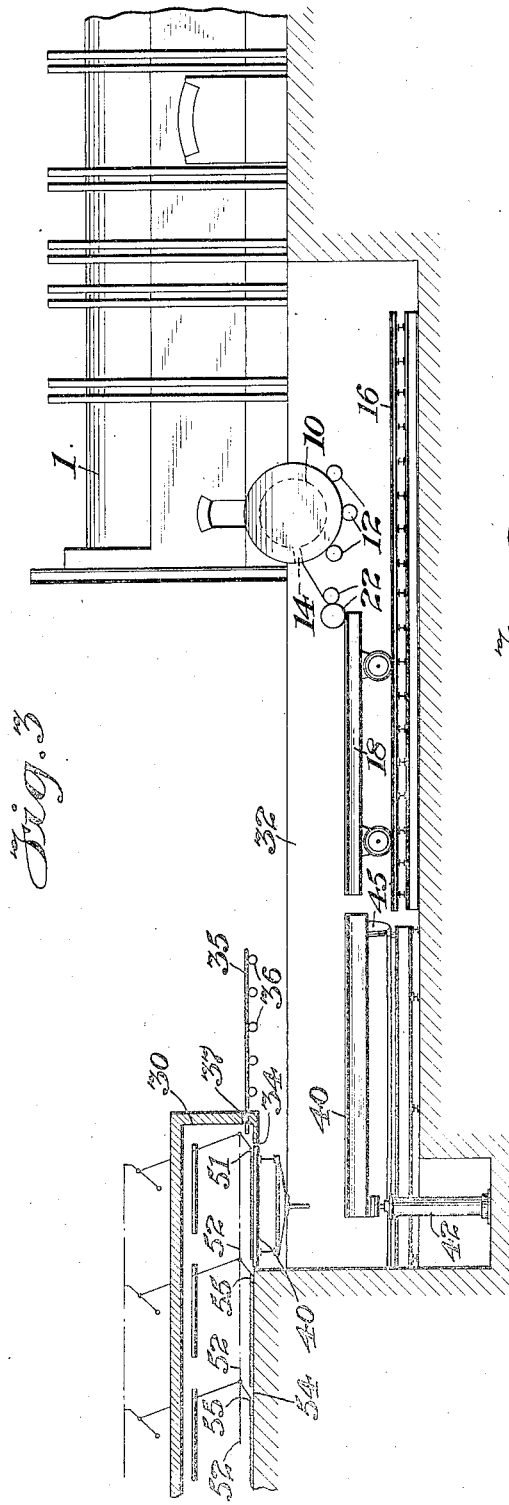
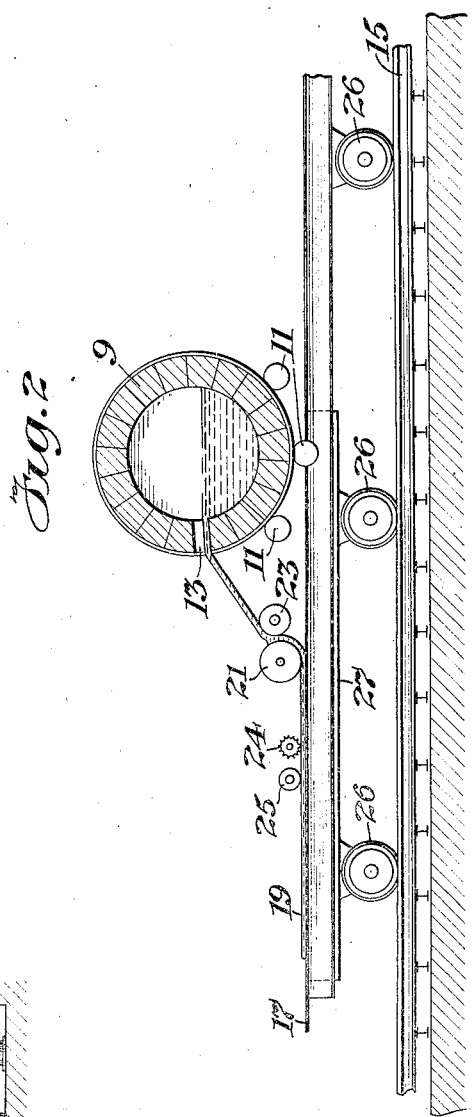
INVENTOR  
Paul F. Gutmann  
BY  
Cooper, Kerr & Dunham  
HIS ATTORNEYS Patented May 22, 1928.

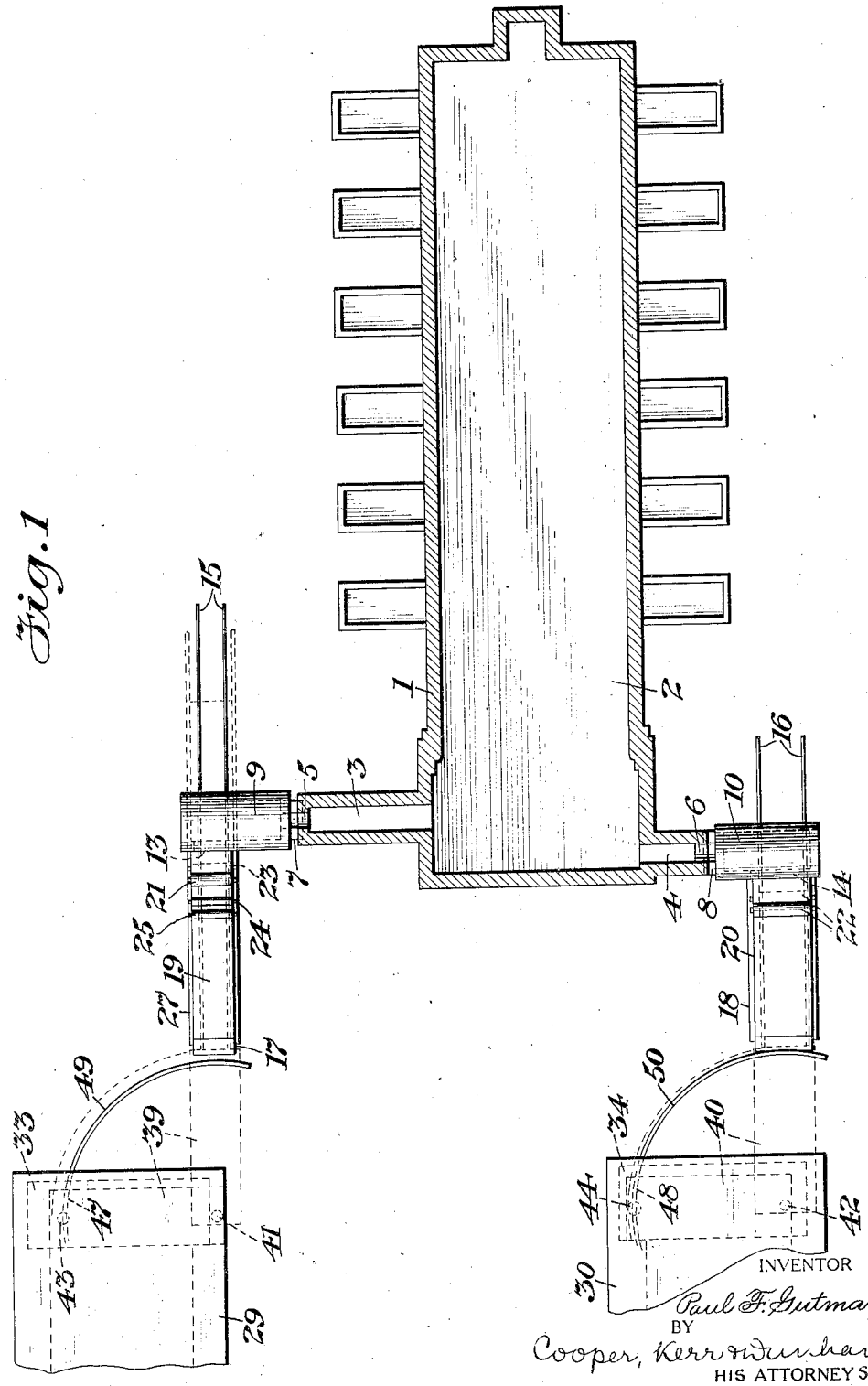

1,671,073

UNITED STATES PATENT OFFICE.

PAUL F. GUTMANN, OF ST. LOUIS, MISSOURI, ASSIGNOR TO MISSISSIPPI GLASS COMPANY, A CORPORATION OF NEW YORK.

SHEET-GLASS PRODUCTION.

Application filed May 21, 1925. Serial No. 31,824.

My present invention relates to glass-handling apparatus and particularly to method and means for passing molten glass from a melting furnace and delivering it to means for forming it into sheets, strips and the like, and useful in the arts generally for handling liquid materials.

In the pouring of molten glass from the melting furnace onto a forming table or between forming rolls for the manufacture of sheet glass to secure best results it is necessary to use some means for spreading the glass out as it comes from the furnace to substantially the width of the sheets to be formed therefrom. Various means are employed for this purpose but I have discovered that uniformity of state throughout the finished sheets as well as ease and simplicity of manufacture is obtained by feeding the molten glass from the furnace into a horizontal cylinder or drawn through an end thereof and supplying it therefrom to the forming machinery through a horizontal opening or slit in the side thereof of a length about equal to the width of the sheet glass to be formed.

In the use of such a feeding drum or cylinder it is loaded with its discharge open above center and then rotated axially in either direction to move said opening downwardly in the direction in which it is desired to discharge it. For some purposes such a drum is made with two discharge ports, one on either side, to decrease the distance of rotation when discharge in both directions is employed, such as when one sheet of glass is formed while the previously formed sheet is being moved away and new carrying apparatus brought into position. With the apparatus of my invention, however, the feeding of the molten glass may be made continuous by continuing the pour of glass into the cylinder or drum and maintaining it in position so that the glass will continue to flow therefrom to the forming means or other apparatus.

For making wire glass formed with the apparatus of my present invention I merely insert suitable wire-setting apparatus in its proper relation thereto.

It is therefore a purpose of my invention to provide an easily and quickly dischargeable pouring means for a glass furnace.

It is another purpose of my invention to provide means for feeding molten glass to sheet forming means in the width of the sheet formed.

Further objects of my invention will appear from this specification and the accompanying drawings in which:

Fig. 1 is a diagrammatic plan view of a glass melting furnace in horizontal section with two drum or cylinder dischargers therefor one on either side thereof, said drums feeding to sheet glass forming means and lehrs for receiving the sheets from said forming means.

Fig. 2 is a diagrammatic elevation view in part section of one of the drums of Fig. 1 and a table for receiving formed sheets therefrom.

Fig. 3 is a diagrammatic elevation view in part section of the apparatus of Fig. 1.

In the drawings the glass melting furnace 1 connects near one end, at one side through the tunnel 3, opening 5, and drum spout 7 with the discharging drum 9. On its other side said furnace 1 connects through tunnel 4, opening 6, and drum spout 8 with the discharge drum 10. Said drums 9 and 10 are shown diagrammatically as being supported by the rolls 11 and 12, respectively. Rotative motion is imparted to said drums 9 and 10 when desired through said rolls 11 and 12, respectively, or otherwise by suitable means, not shown. The semi-circular receiving spouts 7 and 8 connecting with the interiors of said drums 9 and 10, respectively, set into and move in circular insets in the wall of the tunnels 3 and 4 about the openings 5 and 6, respectively, the drums 9 and 10 being axially aligned with said tunnels 3 and 4, respectively.

In the side wall of the drums 9 and 10 are respectively the longitudinal openings 13 and 14 parallel to the axes of the respective drums of a length substantially equal to the width in which it is desired to make glass sheets from molten glass handled by said drums. Underneath said drums 9 and 10 and directly under said openings 13 and 14 are, respectively, the tracks 15 and 16 on which ride the flat cars or table frames 17 and 18, respectively, which serve as receiving tables for sheets of glass 19 and 20 formed between the roll 21 and table 17 and between the rolls 22, 22, respectively. The roll 23 serves to guide the stream of sheet glass passing from the drum 9 and by keeping the glass from resting on table before rolling prevents cold balls, slobs or other rolling defects. The toothed roll 24 and the roll 25 serve for setting reenforcing wire into the glass and smoothing the glass thereover (see Figs. 1 and 2).

In Figs. 1 and 2 the table 17 rests in a six wheeled frame, shown at 26, 26. In Figs. 1 and 3 is a similar table 18 with track and wheels fixed thereunder. The method of discharging sheets of formed and severed glass from said tables 17 and 18 and feeding them into the lehrs 29 and 30, respectively, is hereinafter fully described.

The loading means directly associated with lehrs 29 and 30 are similar and the vertical sectional view of lehr 30 in Fig. 3 will serve as a reference in the description of both lehrs 29 and 30. Said lehrs 29 and 30 have their floors at a higher level than the tables 17 and 18, and above the pouring pits 31 and 32, respectively, in which are said receiving tables 17 and 18.

The ends of said lehrs 29 and 30 which are adjacent said pits extend thereover and have openings 33 and 34 respectively in their lower sides which have closures therefor slidable inwardly and outwardly not shown in the plan view but shown in lehr 30 in Fig. 3 in which the sheet 35 slidable over rolls 36 is movable inwardly through slot 37 to cover said opening 34. Below said openings 33 and 34, and of a size to fit therein respectively, are tables 39 and 40 which are pivotally supported at one end on the hydraulic jacks 41 and 42 respectively and at their outer ends on the jacks 43 and 44, wheels 45, 45 being provided under these ends of the tables, which wheels ride on short sections of circular tracks 47 and 48 respectively. Registering with said track sections 47 and 48 are the longer sections 49 and 50 which pass by the ends of tracks 15 and 16 respectively.

Said tables 39 and 40 when in registry below said openings 33 and 34 respectively are movable upwardly and downwardly by means of jacks 41 and 43 and jacks 42 and 44, respectively, for the purpose of carrying sheets of glass from the tables 17 and 18 to the lehrs 29 and 30, respectively, as hereinafter fully described. These tables 39 and 40 are also movable pivotally over said tracks 47, 48 and 49, 50 and about the jacks 41 and 42 as centers respectively to bring their ends into juxtaposition with the ends of tables 17 and 18 when they are moved to the lehr ends of tracks 15 and 16 respectively for the purpose of transferring sheets of glass thereto from said tables 17 and 18.

The shoe 51 (see Fig. 3) actuated by the push and pull rod 52 serves to move the glass sheet 20 from table 40 onto the floor 54 of the lehr 30 (similarly in lehr 29) through which it is moved by shoes 55, 55 through said rod 52.

In the operation of the apparatus of my invention molten glass 2 is flowed from the melting furnace 1 through one of the tunnels 3 or 4. Following through tunnel 3 for example the molten glass flows through opening 5, spout 7 into drum 9, which is in such a position that the discharge opening 13 is above the center of the drum. By means of the supporting rolls 11, 11 said drum 9 is rotated to move said opening 13 downwardly toward rolls 21 and 23, and the glass flowing from said opening 13 led between rolls 21 and 23 and between roll 21 and table 17 at the forward end of the table. Roll 21 is then rotated and table 17 moved forward to form the glass sheet 19 therebetween and cut off by suitable means, as by tilting the drum back, when the desired length of sheet glass has been formed on said table 17. During the movement of the table in the formation of the sheet suitable wire netting fed over the roll 24 is pressed into the sheet 19 by the teeth of said roll 24 and the glass smoothed thereover by the roll 25. The table 17 is then moved into juxtaposition and in alignment with the table 39 and the sheet 19 slid from the table 17 onto table 39, which is then moved pivotally on its wheels over the track 49—47 about the jack 41 and into registry with the opening 33. Jacks 41 and 43 are then actuated to raise said table 39 with the glass sheet 19 up to the level of the floor of the lehr 29 where said sheet is moved from the table 39 to the lehr floor by apparatus similar to that described below and in the lehr 30. In moving table 17 toward table 39 over track 15 after the truck 27 has been moved as far as the tracks 15 and table 39 allow it tables 17 and 39 are quite close to each other whereby the transfer of sheet 19 from one to the other is simplified.

Similarly, glass is flowed from furnace 1 through tunnel 4, opening 6, spout 8 and drum 10, through opening 14 and fed between the forming rolls 22 which form the glass sheet 20 and lay it down on table 18 as the latter is moved thereunder over tracks 16 and the sheet cut to the desired length by suitable means, or by tilting the drum back. Tables 18 and 40 then being brought into juxtaposition, the sheet 20 is slid from table 18 to table 40 and table 40 rotated about jack 42 over track 50, 48 into registry under opening 34 (see Fig. 3). Jacks 42 and 44 are then actuated to lift table 40 to the level of floor 54 of lehr 30, closure 35 having been withdrawn from opening 34 onto the rollers 36. The shoe 51 actuated reciprocating from opening 34 toward the interior of the lehr 30 by the push and pull rods 52 and having a stroke greater than the width of sheet 20 (here figured 53) moves said sheet past the extreme backward position of the next push and pull shoe 55 which, in turn, moves it along to the next shoe 55 and so on into and through the lehr.

What I claim is:

1. In combination with a glass melting furnace, a horizontally disposed drum having an intake opening at one end thereof in operable relation with a discharge opening of said furnace and a horizontal opening in the side thereof parallel to its axis, means for rotating said drum on its axis, and glass sheet forming means in operable relation with said horizontal opening in its discharge position and a support member having a receiving surface in operable relation to said sheet forming means and being movable to receive the sheet in a flat position thereon as it is formed.

2. In combination with a glass melting furnace, a horizontally disposed drum having an intake opening at one end thereof in operable relation with a discharge opening of said furnace and a horizontal opening in its side parallel to its axis, means for rotating said drum on its axis, and glass sheet forming rolls in operable relation with said horizontal opening in its discharge position and a support member having a receiving surface in operable relation to said forming rolls and being movable to receive the sheet in a flat position thereon as it is formed.

3. In combination with a glass melting furnace; a horizontally disposed drum having a refractory lining, an intake opening at one end thereof in operable relation with a discharge opening in said melting furnace, and a horizontal discharge opening in its side parallel to the axis thereof; means for rotating said drum on its axis; and glass sheet forming rolls in operable relation with said horizontal discharge opening in its discharge position and a carrying member having a receiving surface in operable relation to said forming rolls and being movable to receive sheet glass therefrom as it is formed.

4. Apparatus for receiving molten glass and discharging it over an extended surface for the formation of sheet glass and the like comprising, a sheet metal outer drum horizontally disposed having an intake opening through one end thereof and a horizontal longitudinal opening in its side parallel to its axis, and a lining therefor of heat resistant material, and means for rotating the drum about its axis to bring said horizontal discharge opening into the discharge position and a support member having a receiving surface in operable relation to said discharge opening and being movable to receive molten glass fed thereto in a continuous stream or sheet.

In testimony whereof I hereto affix my signature.

PAUL F. GUTMANN.